(12) United States Patent
Shibayama et al.

(10) Patent No.: US 10,899,117 B2
(45) Date of Patent: Jan. 26, 2021

(54) DECORATIVE SHEET AND METHOD OF PRODUCING DECORATIVE SHEET

(71) Applicant: TOPPAN PRINTING CO., LTD., Tokyo (JP)

(72) Inventors: Naoyuki Shibayama, Tokyo (JP); Masamitsu Nagahama, Tokyo (JP); Akira Sato, Tokyo (JP); Masatoshi Takahashi, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/399,816

(22) Filed: Apr. 30, 2019

(65) Prior Publication Data

US 2019/0255827 A1    Aug. 22, 2019

Related U.S. Application Data

(63) Continuation of application No. PCT/JP2017/042865, filed on Nov. 29, 2017.

(30) Foreign Application Priority Data

Nov. 29, 2016 (JP) .................................. 2016-231447

(51) Int. Cl.
  *B32B 3/30* (2006.01)
  *B32B 27/00* (2006.01)
  (Continued)

(52) U.S. Cl.
  CPC .............. *B32B 27/18* (2013.01); *B32B 3/263* (2013.01); *B32B 3/30* (2013.01); *B32B 7/12* (2013.01);
  (Continued)

(58) Field of Classification Search
  None
  See application file for complete search history.

(56) References Cited

U.S. PATENT DOCUMENTS

4,783,220 A * 11/1988 Gamble ................. A61K 9/127
                                                    106/266
5,985,079 A * 11/1999 Ellison ................. B32B 37/153
                                                    156/244.23
(Continued)

FOREIGN PATENT DOCUMENTS

CN         103469605 A    12/2013
JP         09314791 A *   12/1997
(Continued)

OTHER PUBLICATIONS

Machine Translation of JP-2000272057-A, Oct. 2000 (Year: 2000).*
(Continued)

*Primary Examiner* — Jeffrey A Vonch
(74) *Attorney, Agent, or Firm* — Foley & Lardner LLP

(57) ABSTRACT

A decorative sheet including a substrate layer, and one or more layers of at least one of a transparent resin layer and a top coat layer provided on one surface of the substrate layer, the one or more layers being provided as a front surface layer, wherein at least one layer of the transparent resin layer and the top coat layer contains a radical scavenger, and the radical scavenger is contained in a form of radical scavenger vesicles, which encapsulate the radical scavenger within an outer membrane.

18 Claims, 1 Drawing Sheet

(51) Int. Cl.

| | | |
|---|---|---|
| B32B 27/08 | (2006.01) | |
| B32B 27/18 | (2006.01) | |
| B32B 27/32 | (2006.01) | |
| B32B 27/40 | (2006.01) | |
| C08K 9/10 | (2006.01) | |
| C09D 7/48 | (2018.01) | |
| C08K 5/00 | (2006.01) | |
| C08K 5/17 | (2006.01) | |
| C08K 5/521 | (2006.01) | |
| C08L 23/12 | (2006.01) | |
| B32B 3/26 | (2006.01) | |
| B32B 7/12 | (2006.01) | |
| C08L 75/04 | (2006.01) | |
| C09D 123/12 | (2006.01) | |
| C09D 175/00 | (2006.01) | |
| C09D 123/04 | (2006.01) | |
| B32B 27/10 | (2006.01) | |
| B32B 37/00 | (2006.01) | |
| C08K 5/3435 | (2006.01) | |
| C09D 11/00 | (2014.01) | |
| C09D 7/65 | (2018.01) | |

(52) U.S. Cl.
CPC .............. *B32B 27/00* (2013.01); *B32B 27/08* (2013.01); *B32B 27/32* (2013.01); *B32B 27/40* (2013.01); *C08K 5/005* (2013.01); *C08K 5/17* (2013.01); *C08K 5/521* (2013.01); *C08K 9/10* (2013.01); *C08L 23/12* (2013.01); *C08L 75/04* (2013.01); *C09D 7/48* (2018.01); *C09D 123/04* (2013.01); *C09D 123/12* (2013.01); *C09D 175/00* (2013.01); *B32B 27/10* (2013.01); *B32B 37/00* (2013.01); *B32B 2250/02* (2013.01); *B32B 2250/03* (2013.01); *B32B 2250/24* (2013.01); *B32B 2255/10* (2013.01); *B32B 2255/26* (2013.01); *B32B 2264/0264* (2013.01); *B32B 2264/402* (2020.08); *B32B 2264/403* (2020.08); *B32B 2305/54* (2013.01); *B32B 2307/4023* (2013.01); *B32B 2307/412* (2013.01); *B32B 2307/414* (2013.01); *B32B 2307/70* (2013.01); *B32B 2307/71* (2013.01); *B32B 2307/712* (2013.01); *B32B 2323/00* (2013.01); *B32B 2323/10* (2013.01); *B32B 2375/00* (2013.01); *B32B 2451/00* (2013.01); *C08K 5/3435* (2013.01); *C08K 2201/012* (2013.01); *C08L 2201/08* (2013.01); *C08L 2666/20* (2013.01); *C08L 2666/78* (2013.01); *C09D 7/65* (2018.01); *C09D 11/00* (2013.01); *Y10T 428/24479* (2015.01); *Y10T 428/2989* (2015.01); *Y10T 428/31909* (2015.04)

(56) References Cited

U.S. PATENT DOCUMENTS

| | | | | |
|---|---|---|---|---|
| 6,025,433 | A * | 2/2000 | Shibatoh | C08G 18/6229 524/323 |
| 6,187,424 | B1 * | 2/2001 | Kjellqvist | C08L 23/0815 428/220 |
| 6,337,126 | B1 * | 1/2002 | Simpson | B32B 27/065 428/308.4 |
| 9,365,048 | B1 | 6/2016 | Robinson et al. | |
| 2002/0155283 | A1 * | 10/2002 | Carter | B32B 27/32 428/343 |
| 2003/0112311 | A1 * | 6/2003 | Naik | B41M 7/0027 347/105 |
| 2004/0161568 | A1 * | 8/2004 | Truog | B32B 37/153 428/40.1 |
| 2004/0180211 | A1 * | 9/2004 | Moravec | C08K 5/0041 428/422.8 |
| 2006/0052491 | A1 * | 3/2006 | Braig | A61K 8/4966 524/99 |
| 2009/0118400 | A1 * | 5/2009 | Sawaguchi | C08K 5/3435 524/99 |
| 2009/0258041 | A1 * | 10/2009 | Mongiat | A61P 17/18 424/401 |
| 2010/0048750 | A1 * | 2/2010 | Blom | C09J 133/08 521/121 |
| 2010/0261022 | A1 * | 10/2010 | Higuchi | C09D 5/32 428/446 |
| 2011/0130492 | A1 * | 6/2011 | Mader | C08K 5/3435 524/102 |
| 2012/0328541 | A1 * | 12/2012 | Baschong | A61K 8/553 424/59 |
| 2013/0287986 | A1 | 10/2013 | Yamamuro et al. | |
| 2014/0349096 | A1 | 11/2014 | Miyazaki et al. | |
| 2015/0368432 | A1 * | 12/2015 | Smith | B60R 13/02 264/171.1 |
| 2016/0130213 | A1 * | 5/2016 | Barman | C08G 18/14 521/115 |
| 2017/0368837 | A1 * | 12/2017 | Kesti | C09D 11/54 |
| 2018/0186131 | A1 * | 7/2018 | Kudo | B32B 27/00 |
| 2018/0186132 | A1 * | 7/2018 | Ikeda | E04F 13/0866 |
| 2018/0186135 | A1 * | 7/2018 | Higashikawa | C08J 5/18 |
| 2019/0016104 | A1 * | 1/2019 | Kashiwame | B32B 15/20 |
| 2019/0048212 | A1 * | 2/2019 | Breon | C09D 7/41 |

FOREIGN PATENT DOCUMENTS

| | | | | |
|---|---|---|---|---|
| JP | 09314792 | A * | 12/1997 | |
| JP | 11147292 | A * | 6/1999 | |
| JP | 2000272057 | A * | 10/2000 | |
| JP | 2000289162 | A * | 10/2000 | |
| JP | 2001-270054 | A | 10/2001 | |
| JP | 2001315270 | A * | 11/2001 | |
| JP | 2003039613 | A * | 2/2003 | |
| JP | 2003340973 | A * | 12/2003 | |
| JP | 2006-298840 | A | 11/2006 | |
| JP | 2006328272 | A * | 12/2006 | |
| JP | 2007119623 | A * | 5/2007 | |
| JP | 2007-204666 | A | 8/2007 | |
| JP | 3959813 | B2 | 8/2007 | |
| JP | 4032829 | B2 | 1/2008 | |
| JP | 2008-062416 | A | 3/2008 | |
| JP | 2009-184167 | A | 8/2009 | |
| JP | 2011-056879 | A | 3/2011 | |
| JP | 2011042041 | A * | 3/2011 | |
| JP | 2013122020 | A * | 6/2013 | |
| JP | 2016-117280 | A | 6/2016 | |
| JP | 2016117280 | A * | 6/2016 | |
| JP | 2016-155233 | A | 9/2016 | |
| JP | 2016-168830 | A | 9/2016 | |
| JP | 2016165807 | A * | 9/2016 | .......... B32B 38/06 |
| JP | 2016-190464 | A | 11/2016 | |
| WO | WO-02/32564 | A1 | 4/2002 | |
| WO | WO-2006035945 | A1 * | 4/2006 | .......... B32B 27/32 |
| WO | WO-2008041649 | A1 * | 4/2008 | .......... B32B 38/06 |
| WO | WO-2012/090498 | A1 | 7/2012 | |

OTHER PUBLICATIONS

Machine Translation of JP-2007119623-A, May 2007 (Year: 2007).*
Machine Translation of JP-2013122020-A, Jun. 2013 (Year: 2013).*
Basf SE et al., Coatings that stay looking good, Mar. 2011 (Year: 2011).*
International Searching Authority, "International Search Report," issued in connection with International Patent Application No. PCT/JP2017/042865, dated Mar. 6, 2018.
International Searching Authority, "Written Opinion," issed in connection with International Patent Application No. PCT/JP2017/042865, dated Mar. 6, 2018.
Extended European Search Report issued in European Patent Application No. 17876820.6, dated Aug. 19, 2019 (7 pages).
Chinese Office Action dated Aug. 6, 2019 for corresponding Application No. CN2016800604403.

(56) References Cited

OTHER PUBLICATIONS

Extended European Search Report dated Apr. 18, 2019 in corresponding application No. 16842032.1.
International Searching Authority, "International Search Report and Written Opinion," issued in connection with International Patent Application No. PCT/JP2016/075898, dated Nov. 29, 2016.
Japanese Office Action dated Nov. 26, 2019 for corresponding Application No. 2016-003512.
Liposome of III. Cosmetic Formulation Technique. In New Cosmetics Handbook, 30 Japan, Oct. 30, 2006, pp. 683-698.
Office Action dated Apr. 7, 2020 for corresponding Japanese Patent Application No. 2016-003513.
Office Action dated Mar. 19, 2020 for corresponding Chinese Patent Application No. 201680060440.3.
Zhang et al.—"Preparation and properties of a controlled-release microencapsulated ultraviolet stabilizer"; Modern Chemical Industry; Jun. 2015; p. 124-127.
Office Action dated Jul. 23, 2020 for corresponding Chinese Patent Application No. 201680060440.3.

* cited by examiner

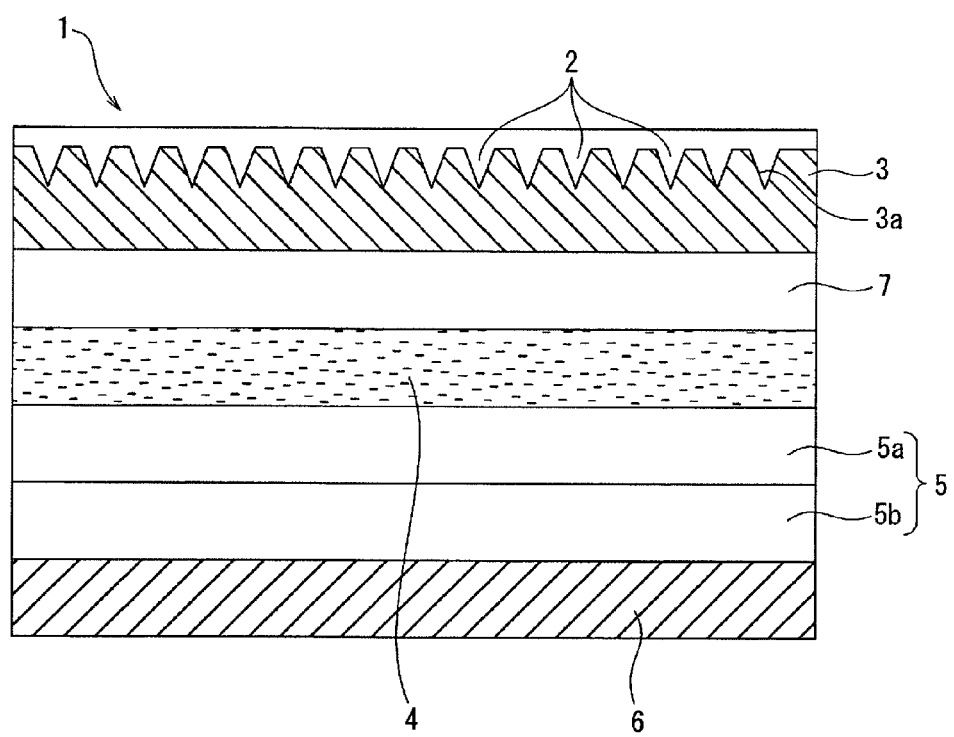

DECORATIVE SHEET AND METHOD OF PRODUCING DECORATIVE SHEET

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2017/042865, filed on Nov. 29, 2017, which is based upon and claims the benefit of priority to Japanese Patent Application No. 2016-231447, filed on Nov. 29, 2016; the disclosures of which are incorporated herein by reference in their entireties.

TECHNICAL FIELD

The present invention relates to a decorative sheet used for interior decoration materials of buildings, exterior decoration materials for front doors, surface materials for fixtures, surface materials for home appliances, and the like, and a method of producing the decorative sheet.

BACKGROUND ART

In recent years, a number of decorative sheets in which olefin-based resin is used have been proposed as alternatives to polyvinyl chloride decorative sheets. Soft polyolefin sheets made of olefin-based resin, which are generally used as decorative sheets, are soft and thus subject to damage. Accordingly, there is a problem that using highly crystalline and high isotacticity resins to improve scratch resistance may cause poor weatherability.

In order to improve weatherability, PTL 1 discloses providing a top coat layer made of resin, including a triazine-based ultraviolet absorbent, which is an organic ultraviolet absorbent, on a surface of the polyolefin sheet.

CITATION LIST

[Patent Literature] PTL 1: JP 4032829 B2

SUMMARY OF THE INVENTION

Technical Problem

However, when an organic ultraviolet absorbent of the amount required for sufficient weatherability is added to a target resin layer such as the top coat layer, there may be a case where aggregation of the organic ultraviolet absorbent occurs in the resin composition constituting the resin layer. In particular, in a transparent layer made up of a top coat layer and a transparent resin layer, occurrence of aggregation in the resin layer which requires transparency is problematic in that designability of the decorative sheet is reduced.

Aggregation of organic ultraviolet absorbent in the resin composition often causes bleeding-out, by which aggregated organic ultraviolet absorbent is bled out on the surface of the resin layer. When bleeding-out occurs, the top coat layer constituting the outermost layer become sticky on the sheet surface, and the transparent resin layer has a problem such as reduced adhesiveness to other resin layers.

Moreover, aggregation may also occur when a large amount of photostabilizer is added. Aggregation of photostabilizer causes bleeding-out, which leads to reduced weatherability, transparency, or designability (see paragraph 0023 in PTL 1).

In addition, when an embossed pattern is formed to improve designability of the decorative sheet, recessed portions of the embossed pattern have a reduced thickness compared to the remaining portion. Accordingly, weatherability is particularly reduced. Further, deterioration may occur in these recesses, leading to a problem such as whitening or cracking.

The present invention has been made in view of the above issues. An object of the present invention is to provide a decorative sheet with improved designability and transparency, and a method of producing the same.

Solution to Problem

The present inventors have found that dispersibility of radical scavenger in the resin material can be even drastically improved by having the resin contain radical scavenger in the form of vesicles encapsulated within an outer membrane, and that this enables the decorative sheet to exhibit both transparency required and high weatherability if the radical scavenger is contained in the resin layer.

In order to attempt to improve or solve the problem, an aspect of the present invention is a decorative sheet including a substrate layer, and one or more layers of at least one of a transparent resin layer and a top coat layer provided on one surface of the substrate layer, the one or more layers being provided as a front surface layer, wherein at least one layer which forms the front surface layer contains a radical scavenger, and the radical scavenger is contained in a form of radical scavenger vesicles, which encapsulate the radical scavenger in an outer membrane.

The radical scavenger vesicles are preferably contained in a layer constituting the outermost layer in the front surface layer.

Further, another aspect of the present invention is a method for producing a decorative sheet including a substrate layer, and one or more layers of at least one of a transparent resin layer and a top coat layer provided on one surface of the substrate layer, the one or more layers being provided as a front surface layer, wherein at least one layer which forms the front surface layer is formed by adding a radical scavenger in the form of radical scavenger vesicles, which encapsulate the radical scavenger in an outer membrane, to a resin constituting the at least one layer which forms the front surface layer.

Advantageous Effects of Invention

According to an aspect of the present invention, a decorative sheet having improved or even high designability and exhibiting improved long-term weatherability due to the radical scavenger being contained in the form of vesicles on the front surface of the decorative sheet, and a method of producing the same, can be provided.

BRIEF DESCRIPTION OF THE DRAWING

The FIGURE is a cross-sectional view of a decorative sheet according to an embodiment of the present invention.

DESCRIPTION OF REPRESENTATIVE EMBODIMENTS

With reference to the FIGURE, a description will now be given of representative embodiments according to the present invention. The present invention is not limited to the following representative embodiments, and appropriate modifications can be made without departing from the spirit of the present invention. The representative embodiments described below are merely examples of the present invention, and the design thereof could be appropriately changed by one skilled in the art. Here, the FIGURE is schematic, and the relationship between thickness and plane size, the ratio of the thickness of each layer, etc., are different from actual ones. The embodiments described below are merely examples of the configurations for embodying the technical idea of the present invention, and the technical idea of the present invention should not limit the materials, shapes, structures, and the like of the components to those described below. The technical idea of the present invention can be modified in various ways within the technical scope specified by the claims.

The same constituent elements are denoted by the same reference numerals unless there is a reason for the sake of convenience, and redundant description is omitted. In the FIGURE referred to in the following description, for clarity, characteristic parts are enlarged, and thus the components are not shown to scale. It is, however, clear that one or more embodiments can be implemented without such details. In addition, known structures and devices may be schematically represented for simplicity.

Referring to the FIGURE, an embodiment of the present invention will be described.

A decorative sheet of the present embodiment includes a substrate layer, and a transparent resin layer and a top coat layer disposed in this order, as front surface layers, on one surface of the substrate layer. The top coat layer and the transparent resin layer may be each composed of two or more layers. At least one of the top coat layer and the transparent resin layer contains a radical scavenger. In the present embodiment, the radical scavenger is contained in a target resin layer in the form of radical scavenger vesicles, which encapsulate the radical scavenger within an outer membrane.

The following description will be given for the case where both the top coat layer and the transparent resin layer contain radical scavenger vesicles.

Radical scavenger vesicles have a configuration in which the radical scavenger is encapsulated in small sac-like capsules (outer membranes), each having a membrane structure closed in the form of a spherical shell. The radical scavenger vesicles can have significantly high dispersibility since their outer membranes have a repelling effect, which prevents particle aggregation. By virtue of this effect, the radical scavenger can be homogeneously dispersed in the resin composition which constitutes the top coat layer and the transparent resin layer.

Examples of the method for obtaining radical scavenger vesicles (vesicle formation method) include the Bangham method, extrusion, hydration, reverse phase evaporation, freeze-thaw, and supercritical reverse phase evaporation.

In the Bangham method, chloroform or chloroform/methanol mixture solvent is placed in a vessel such as a flask, and phospholipid is added thereto and dissolved. Then, the solvent is removed by using an evaporator to form a thin film made of lipid. After a dispersion of an additive is added thereto, the mixture is hydrated and dispersed by using a vortex mixer to thereby obtain vesicles. The extrusion method is a method for obtaining vesicles by preparing a solution of thin film phospholipid, and passing the solution through a filter instead of using a mixer which is used in the Bangham method as external perturbation. The hydration method is a preparation method which is substantially the same as the Bangham method except that the mixture is dispersed by gently stirring without using a mixer for obtaining vesicles. The reverse phase evaporation method is a method for obtaining vesicles by dissolving the phospholipid in diethylether or chloroform, adding a solution containing an additive to prepare a W/O emulsion, removing an organic solvent from the emulsion under reduced pressure, and adding water thereto. The freeze-thaw method uses cooling and heating as external perturbation. Vesicles are obtained by repeating the cooling and heating cycle.

The outer membrane constituting a radical scavenger vesicle is, for example, a monolayer. Further, the outer membrane is made of, for example, a substance containing a biological lipid such as a phospholipid.

As a method for obtaining radical scavenger vesicles having a monolayer outer membrane, the supercritical reverse phase evaporation method can be used, for example. The supercritical reverse phase evaporation method refers to the method disclosed in the publications of JP-T-2002/032564, JP-A-2003-119120, JP-A-2005-298407, and JP-A-2008-063274 (hereinafter, collectively referred to as "supercritical reverse phase evaporation method publications") proposed by the present inventors, and the method and apparatus described in the supercritical reverse phase evaporation method publications can be used to obtain vesicles. Specifically, the supercritical reverse phase evaporation method refers to a method for obtaining capsule-like vesicles, which encapsulate radical scavenger as an encapsulation substance in a monolayer film, by adding an aqueous phase containing radical scavenger as a water soluble or hydrophilic encapsulation substance to a mixture in which a substance for forming an outer membrane of vesicles is homogeneously dissolved in carbon dioxide in a supercritical state or under a temperature condition or pressure condition that is equal to or exceeds the critical point.

In this description, radical scavenger vesicles having an outer membrane made of biological lipid such as phospholipid are referred to as radical scavenger liposomes.

Further, carbon dioxide in a supercritical state refers to carbon dioxide that is in a supercritical state with a temperature that is equal to or higher than the critical temperature (30.98° C.) and a pressure that is equal to or higher than the critical pressure (7.3773±0.0030 MPa). Carbon dioxide under a temperature condition or a pressure condition that is equal to or exceeds the critical point indicates carbon dioxide under conditions where only one of the critical temperature and the critical pressure exceeds the critical condition. According to this method, unilamellar vesicles with a diameter of 50 to 800 nm containing radical scavengers can be obtained.

Examples of phospholipid that constitutes the outer membrane include glycerophospholipids such as phosphatidylcholine, phosphatidylethanolamine, phosphatidylserine, phosphatidic acid, phosphatidylglycerol, phosphatidylinositol, cardiopine, yolk lecithin, hydrogenated yolk lecithin, soybean lecithin, and hydrogenated soybean lecithin, and sphingophospholipids such as sphingomyelin, ceramidephosphoryl ethanolamine, and ceramidephosphoryl glycerol.

Other substances that constitute the outer membrane of vesicles may be a dispersant such as a nonionic surfactant, or a mixture of the nonionic surfactant and cholesterols or triacylglycerol. Examples of the nonionic surfactant include one or more of the following: polyglycerol ether, dialkylglycerine, polyoxyethylene hydrogenated castor oil, polyoxyethylene alkyl ether, polyoxyethylene sorbitan fatty acid ester, sorbitan fatty acid ester, polyoxyethylene polyoxypropylene copolymer, polybutadiene-polyoxyethylene copolymer, polybutadiene-poly 2-vinylpyridine, polystyrene-polyacrylic acid copolymer, polyethylene oxide-polyethylethylene copolymer, and polyoxyethylene-polycaprolactam copolymer. Examples of the cholesterols include cholesterol, α-cholestanol, β-cholestanol, cholestane, desmosterol (5,24-cholestadiene-3β-ol), sodium cholate, and cholecalciferol.

The outer membrane of the liposomes may be made of a mixture of phospholipid and a dispersant. In the decorative sheet of the present embodiment, the radical scavenger vesicles are preferably radical scavenger liposomes having an outer membrane made of phospholipid. The outer membrane made of phospholipid ensure good miscibility with the resin material which is the main component of the top coat layer and the transparent resin layer and the vesicles.

As the radical scavenger, a hindered amine-based photostabilizer is preferably used.

Examples of the hindered amine-based photostabilizer include bis(1,2,2,6,6-pentamethyl-4-piperidyl)[[3,5-bis(1,1-dimethylethyl)-4-hydroxyphenyl]methyl]butylmalonate (a typical example is "TINUVIN 144" ® manufactured by BASF Corporation), "TINUVIN 123" ® manufactured by BASF Corporation, decanedioic acid bis(2,2,6,6-tetramethyl-1-(octyloxy)-4-piperidinyl)ester, and reaction products with (1,1-dimethylethyl hydroperoxide) and octane.

When radical scavenger vesicles are added to the top coat layer, the amount added is preferably in the range of 0.05 parts by mass or more and 10.0 parts by mass or less, more preferably in the range of 0.2 parts by mass or more and 5.0 parts by mass or less per 100 parts by mass of the resin forming the top coat layer. When the added amount of the radical scavenger vesicles is less than 0.05 parts by mass, stability of the resin to ultraviolet radiation may be poor. On the other hand, an amount larger than 10.0 parts by mass may cause bleed out.

Further, when the radical scavenger vesicles are added to the transparent resin layer, the added amount is preferably in the range of 0.1 parts by mass or more and 7.5 parts by mass or less, more preferably in the range of 0.2 parts by mass or more and 5.0 parts by mass or less per 100 parts by mass of olefin-based resin, which is the main component of the transparent resin layer. When the added amount of the radical scavenger vesicles is less than 0.1 parts by mass, stability of the resin to ultraviolet radiation may be poor. On the other hand, an amount larger than 7.5 parts by mass may cause bleed out.

Further, in the present embodiment, the radical scavenger in the resin constituting the top coat layer may be contained in vesicles in a state of being partially exposed. Further, in the present embodiment, the radical scavenger in the resin constituting the transparent resin layer may be contained in vesicles in a state of being partially exposed.

As described above, one of the features of the decorative sheet of the present embodiment (features specifying the invention) is that at least one of the "transparent resin layer" and "top coat layer" contains a radical scavenger in the form of radical scavenger vesicles, which encapsulate radical scavenger within an outer membrane. The radical scavenger in the state of being contained in vesicles is added to the resin composition to thereby exhibit the effect of drastically improving dispersibility of the radical scavenger in the resin material, that is, at least one of the transparent resin layer and the top coat layer. However, in some situations, it may be difficult or impractical to directly specify such a feature from the physical structure or properties of the produced decorative sheet. The reasons are as follows. The radical scavenger added in the form of vesicles is dispersed with high dispersibility, and thus the radical scavenger is highly dispersed in at least one of the transparent resin layer and the top coat layer in the produced decorative sheet. However, in production of the decorative sheet, various processing such as compression and curing is typically applied to a laminate after preparation of at least one of the transparent resin layer and the top coat layer by adding the radical scavenger in the form of vesicles to the resin composition constituting at least one of the transparent resin layer and the top coat layer. Due to such processing, the outer membrane of vesicles containing radical scavenger may be crushed or chemically reacted, which may cause the radical scavenger not to be contained (encapsulated) in the outer membrane with high probability. The degree of crushing or chemical reaction of the outer membrane varies depending on the processing steps of the decorative sheet. It is difficult to specify the situation, such as that the radical scavenger is not contained in an outer membrane, from a numerical range of the physical properties per se. Further, it may also be difficult to determine whether the constituent material of the crushed outer membrane is the outer membrane of the vesicles or a material which is added separately from the radical scavenger. Thus, while the present invention is different from the conventional art in that the radical scavenger is blended in a highly dispersed condition, it may be impractical to specify whether this is attributed to the fact that the radical scavenger has been added in the form of vesicles containing radical scavenger, from a numerical range that can be analyzed based on the measurements of structure and properties of the decorative sheet.

In the decorative sheet of the present embodiment, the transparent resin layer has an embossed pattern formed by embossing or the like, and the top coat layer is formed at least by being filled in the recesses of the embossed pattern. In this case, the top coat layer is provided on the surface of the transparent resin layer preferably by wiping, by which the recesses are filled with the top coat layer.

Further, when an ink layer is provided as an underlayer of the transparent resin layer, the ink layer preferably includes at least a photostabilizer. As the photostabilizer, a hindered amine-based material or a hindered phenol-based material is preferably used. Providing the photostabilizer in the ink layer can prevent radicals generated by degradation of the binder resin itself which forms the ink layer or the resin of other layers from reducing the chemical components of the ink pigment to thereby prevent discoloration of the pigment. Accordingly, a vivid color pattern can be maintained over a long period of time.

Referring to the FIGURE, specific examples of the decorative sheet of the present embodiment will be described.

A decorative sheet 1 shown in the FIGURE includes a primary film layer 6 constituting a substrate layer, and an ink layer 5, an adhesive layer 4, a transparent resin layer 3, and a top coat layer 2, which are disposed in this order on the primary film layer 6. An embossed pattern 3a which forms an embossed pattern is formed on the upper surface of the transparent resin layer 3. The embossed pattern may be formed by methods other than embossing.

The decorative sheet 1 is composed of, for example, a laminate in which the adhesive layer 4 is formed on a primary film resin sheet, which is the primary film layer 6 having the ink layer 5 formed thereon, and a laminate in which the transparent resin layer 3 containing radical scavenger vesicles is co-extruded with an adhesive resin layer 7, which are bonded to each other by dry lamination, extrusion lamination, or the like. In the present embodiment, as shown in the FIGURE, the top coat layer 2 is formed by applying the resin composition containing the radical scavenger vesicles into the recesses of the embossed pattern 3a formed on the transparent resin layer 3 and then wiping off the coating liquid by using a squeegee or the like so that the resin composition is embedded in the recesses. The adhesive resin layer 7 may not be necessarily formed.

The details of each layer will now be described.

On the outermost surface of the decorative sheet 1, the top coat layer 2 having functions of surface protection and gloss control is provided. The resin materials for the main component of the top coat layer 2 may be selected as appropriate from polyurethane, acrylic silicone, fluorine, epoxy, vinyl, polyester, melamine, aminoalkyd, and urea-based resin materials and the like. The form of the resin materials is not limited, and may be, for example, an aqueous, emulsion, or solvent type. The curing method may be appropriately selected from a one-part type, a two-part type, an ultraviolet curing method, and the like. In the present embodiment, the radical scavenger vesicles in the range of 0.2 parts by mass or more and 5.0 parts by mass or less are contained per 100 parts by mass of the resin material constituting the top coat layer 2. In particular, in the present embodiment, the radical scavenger vesicles are preferably radical scavenger liposomes having an outer membrane made of phospholipid which are obtained by the supercritical reverse phase evaporation method.

Further, the main component described herein refers to 50 mass % or more, and preferably 80 mass % or more of the material constituting the layer.

In the present embodiment, the top coat layer 2 is also provided into the recesses of the embossed pattern 3a of the transparent resin layer 3. The top coat layer 2 may be at least embedded in the recesses of the embossed pattern 3a, and high weatherability can be maintained by the embedded top coat layer 2 at the recesses having a decreased layer thickness by forming the embossed pattern 3a. Further, the top coat layer 2 may also be provided to cover the entire surface of the transparent resin layer 3. By providing the top coat layer 2 covering the entire surface, the decorative sheet 1 having further improved weatherability can be provided.

The resin materials used as the main component of the top coat layer 2 preferably include a urethane-based one having isocyanate in view of workability, cost, cohesive force of the resin itself, and the like. The isocyanate may be appropriately selected from adduct, biuret, and isocyanurate hardeners, which are derivatives of tolylene diisocyanate (TDI), xylylene diisocyanate (XDI), hexamethylene diisocyanate (HMDI), diphenylmethane diisocyanate (MDI), lysine diisocyanate (LDI), isophorone diisocyanate (IPDI), bis(isocyanatomethyl) cyclohexane (HXDI), trimethylhexamethylene diisocyanate (TMDI), and the like. In view of weatherability, hardeners based on hexamethylene diisocyanate (HMDI) or isophorone diisocyanate (IPDI) having a linear molecular structure are preferred. In addition, in order to improve surface hardness, resins curable with ionizing radiation, such as ultraviolet and electron beams, are preferably used. Moreover, these resins may be used in combination. For example, use of a hybrid of thermally curable resin and a photo-curable resin can improve surface hardness, reduce cure shrinkage, and enhance adhesion. Furthermore, in order to impart various functions, functional additives such as ultraviolet absorbent, an antimicrobial agent and an antifungal agent may be added to the top coat layer 2. Moreover, in order to improve designability of the surface, alumina, silica, silicon nitride, silicon carbide, glass beads or the like can be added to the top coat layer 2 to control the gloss.

The resin material used as the main component of the transparent resin layer 3 is preferably made of olefin-based resin, and may be, besides polypropylene, polyethylene, polybutene, and the like, a homopolymer or a copolymer of one or more of α-olefins (e.g., propylene, 1-butene, 1-pentene, 1-hexene, 1-heptene, 1-octene, 1-nonene, 1-decene, 1-undecene, 1-dodecene, tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-pentene, 4-ethyl-1-hexene, 3-ethyl-1-hexene, 9-methyl-1-decene, 11-methyl-1-dodecene, 12-ethyl-1-tetradecene, etc.), and a copolymer of ethylene or an α-olefin with another monomer, for example, an ethylene-vinyl acetate copolymer, ethylene-vinyl alcohol copolymer, ethylene-methyl methacrylate copolymer, ethylene-ethyl methacrylate copolymer, ethylene-butyl methacrylate copolymer, ethylene-methyl acrylate copolymer, ethylene-ethyl acrylate copolymer, ethylene-butyl acrylate copolymer, and the like. Further, in order to improve the surface hardness of the decorative sheet 1, highly crystalline polypropylene is preferably used.

Further, in the present embodiment, the transparent resin layer 3, containing the above resin material as a main component, is made up of the resin composition containing the radical scavenger vesicles prepared by the supercritical reverse phase evaporation method. The radical scavenger vesicles are contained preferably in the range of 0.2 parts by mass or more and 5.0 parts by mass or less per 100 parts by mass of the resin material, which is the main component of the transparent resin layer 3. In particular, in the present embodiment, the radical scavenger vesicles are radical scavenger liposomes having an outer membrane made of phospholipid which are obtained by the supercritical reverse phase evaporation method.

Further, the resin composition constituting the transparent resin layer 3 may contain various functional additives such as thermal stabilizer, photostabilizer, ultraviolet absorbent, blocking agent, catalyst scavenger, coloring agent, light scattering agent, and gloss control agent, as necessary. These various functional additives can be suitably selected from known additives.

The embossed pattern 3a is provided to improve designability. The embossed pattern 3a can be formed by a method by which the embossed pattern 3a is formed by applying heat and pressure by using an embossing plate having an embossed pattern before forming the top coat layer 2, or by a method by which the embossed pattern 3a is formed simultaneously with cooling of the sheet by using a cooling roll having an embossed pattern in forming a film using an extruder.

When non-polar polypropylene is used for the transparent resin layer 3, the adhesive resin layer 7 is preferably provided if the transparent resin layer 3 and the resin layer provided on the underside thereof have low adhesiveness to each other. The adhesive resin layer 7 is preferably a resin such as polypropylene, polyethylene, and acrylic resin modified with acid, and a layer thickness is preferably in the range of 2 μm or more and 20 μm or less in view of adhesiveness and heat resistance. Further, the adhesive resin layer 7 is preferably formed by co-extrusion with the transparent resin layer 3 in view of improvement in adhesion strength.

As shown in the FIGURE, on the underside of the transparent resin layer 3, the adhesive layer 4 is provided to improve adhesiveness between the ink layer 5 located thereunder and the transparent resin layer 3. The material for the adhesive layer 4 is not specifically limited, and can be appropriately selected from acrylic, polyester, polyurethane and epoxy-based adhesives and the like. An application method can be appropriately selected depending on the viscosity of the adhesive and the like, and gravure coating is typically used. After being applied by gravure coating on the ink layer 5 on the surface of the primary film layer 6, the adhesive layer 4 is laminated on the transparent resin layer 3 and the adhesive resin layer 7. The adhesive layer 4 may be omitted when the adhesiveness between the transparent resin layer 3 and the ink layer 5 is sufficient.

The ink layer 5 is provided on the underside of the adhesive layer 4. The ink layer 5 includes the pattern layer 5a made of ink which includes at least a photostabilizer. Further, a solid ink layer 5b is provided on the underside of the pattern layer 5a to impart concealing properties. The ink may be appropriately selected from, for example, nitrocellulose, cellulose, vinyl chloride-vinyl acetate copolymer, polyvinyl butyral, polyurethane, acrylic, polyester, and modified products thereof, as a binder. The binder is not limited to aqueous, solvent, or emulsion types. Further, the curing method may be a one-part type or a two-part type which uses a hardener. Further, the ink can be cured by ionizing radiation such as ultraviolet and electron beams. In particular, the most typical method is use of urethane-based ink cured by isocyanate. In addition to these binders, coloring agent such as pigment and dye, extender pigment, solvent, and various additives contained in general ink may be included. Examples of highly versatile pigments include condensed azo pigments, insoluble azo pigments, quinacridones, isoindolines, anthraquinones, imidazolones, cobalt, phthalocyanines, carbon, titanium oxide, iron oxide, pearl pigments such as mica, and the like.

In the solid ink layer 5b, the same material as that used for the pattern layer 5a can be basically used. When the ink is a transparent material, an opaque pigment, iron oxide, titanium oxide, and the like can be used. In addition, metals such as silver, copper, and aluminum can be added to impart concealing properties. Typically, aluminum flakes are used. Further, the solid ink layer 5b may be omitted.

The ink layer 5 can be formed by gravure printing, offset printing, screen printing, flexographic printing, electrostatic printing, ink jet printing, or the like directly applied onto the primary film layer 6. Further, when concealing properties are imparted by a metal, a comma coater, knife coater, lip coater, metal deposition, or sputtering is preferably used.

Further, taking into consideration the adhesiveness of an interface on which a resin material or ink is applied, the surface to be applied is preferably processed with a treatment such as a corona treatment, ozone treatment, plasma treatment, electron beam treatment, ultraviolet treatment, or bichromate treatment before the resin material or ink is applied so that the surface is activated before the lamination process to thereby improve adhesiveness between the layers.

The primary film layer 6, which is a substrate layer, is provided on the underside of the ink layer 5. The primary film layer 6 may be appropriately selected from, for example, paper such as thin paper, titanium paper, and resin impregnated paper, synthetic resin such as polyethylene, polypropylene, polystyrene, polybutylene, polycarbonate, polyester, polyamide, ethylene-vinyl acetate copolymer, polyvinyl alcohol, and acrylic, foams of these synthetic resins, a rubber such as ethylene-propylene copolymer rubber, ethylene-propylene-diene copolymer rubber, styrene-butadiene-styrene block copolymer rubber, and polyurethane, an organic or inorganic nonwoven fabric, synthetic paper, and foil of metal such as aluminum, iron, gold, and silver.

Further, when an olefin-based resin is used as the primary film layer 6, a primer layer (not shown) is preferably provided between the primary film layer 6 and a substrate (not shown) to which the decorative sheet 1 is bonded since the surface of the primary film layer 6 may be often inert. In addition, in order to improve adhesiveness between the primary film layer 6 made of an olefin-based resin and the substrate, the underside of the primary film layer 6 is preferably processed with a treatment such as a corona treatment, plasma treatment, ozone treatment, electron beam treatment, ultraviolet treatment, or bichromate treatment.

Further, although the primer layer may be made of the same material such as that of the ink layer 5, inorganic fillers such as silica, alumina, magnesia, titanium oxide and barium sulfate are preferably contained to avoid blocking and improve adhesiveness to the adhesive, considering web handling of the decorative sheet 1.

In the decorative sheet 1 of the present embodiment, the primary film layer 6 preferably has a thickness in the range of 20 μm or more and 150 μm or less in view of print workability, cost, and the like. The adhesive layer 4 preferably has a thickness in the range of 1 μm or more and 20 μm or less, the transparent resin layer 3 preferably has a thickness in the range of 20 μm or more and 200 μm or less, and the top coat layer 2 preferably has a thickness in the range of 3 μm or more and 20 μm or less. The total thickness of the decorative sheet 1 is preferably in the range of 45 μm or more and 400 μm or less.

As described above, the decorative sheet 1 having the top coat layer 2 and the transparent resin layer 3 which contain radical scavenger vesicles has high designability since the radical scavenger is highly homogeneously dispersed in the resin composition, ensuring transparency, and also exhibits high weatherability to light even with a small content of the radical scavenger. Accordingly, the decorative sheet 1 having high weatherability over a long period of time can be provided.

In addition, since the radical scavenger is highly dispersed in the resin composition, the decorative sheet 1 which prevents occurrence of bleeding-out caused by aggregated additives and has less stickiness on the surface can be provided.

Further, according to the present embodiment, in which the radical scavenger is contained as radical scavenger vesicles, it is possible to meet the demand to contain a large amount of radical scavenger since the radical scavenger can be highly dispersed. As a result, the decorative sheet 1 with improved weatherability can be provided. In addition, providing the radical scavenger vesicles is effective for maintaining flexibility, impact strength, and planar smoothness required for the decorative sheet 1. Further, adding the radical scavenger to the raw material resin of the top coat layer 2 can prevent thickening so that the recesses of the embossed pattern 3a can be thoroughly filled with the coating liquid. Accordingly, the decorative sheet 1 having high designability can be achieved.

Moreover, in the present embodiment, since the radical scavenger liposomes obtained by the supercritical reverse phase evaporation method are used as radical scavenger vesicles, the radical scavenger can be highly homogeneously dispersed in the resin composition which constitutes the top coat layer 2 and the transparent resin layer 3, which is effective to achieve improved transparency and stability of the resin to ultraviolet radiation.

EXAMPLES

Specific examples of the decorative sheet 1 of the present invention will be described below.

<Preparation of Radical Scavenger Vesicles>

Radical scavenger vesicles were prepared by the supercritical reverse phase evaporation method. Specifically, 100 parts by mass of hexane, 70 parts by mass of bis(1,2,2,6,6-pentamethyl-4-piperidyl)[[3,5-bis(1,1-dimethylethyl)-4-hydroxyphenyl]methyl]butylmalonate (TINUVIN 144; manufactured by BASF Corporation) as a radical scavenger, and 5 parts by mass of a phosphatidylcholine as the phospholipid were placed in a high-pressure stainless steel vessel kept at 60° C., and sealed therein. Carbon dioxide was injected into the vessel so that the vessel pressure becomes 20 MPa in a supercritical state. 100 parts by mass of ethyl acetate was injected while vigorously stirring the vessel contents. After stirring for 15 minutes at constant temperature and pressure, carbon dioxide was exhausted for returning to atmospheric pressure. Thus, hindered amine-based photostabilizer liposomes having a monolayer outer membrane made of phospholipid (radical scavenger vesicles 144) were obtained. Further, instead of TINUVIN 144, CHIMASSORB 2020 and TINUVIN XT 850 were processed by using the same method as above to thereby obtain radical scavenger vesicles 2020 and radical scavenger vesicles 850, respectively.

Preparation Example 1

First, a resin, in which 0.5 parts by mass of hindered phenol-based antioxidant (Irganox 1010; manufactured by BASF Corporation), 2.0 parts by mass of hydroxyphenyl triazine (TINUVIN400; manufactured by BASF Corporation) having triazine-based ultraviolet absorbent 2-(4,6-bis (2,4-dimethylphenyl)-1,3,5-triazine-2-yl)-5-hydroxyphenyl as the main component, and 0.2 parts by mass of photostabilizer TINUVIN 144 were added to 100 parts by mass of highly crystalline homopolypropylene resin, was molten extruded by using an extruder to thereby obtain the transparent resin layer 3 in a sheet-shape as a transparent highly crystalline polypropylene sheet with 100 μm thickness. Then, corona treatment was applied on both surfaces of the transparent resin layer 3 thus obtained so that the wetting tension of the sheet surface becomes 40 dyn/cm or higher.

Also, a pattern was printed on one of the surfaces of a 80 μm-thick polyethylene sheet (primary film layer 6) having concealing properties by gravure printing using a two-part type urethane ink (V180; manufactured by Toyo Ink Co., Ltd.) to thereby provide the pattern layer 5a. Further, primer coating was applied on the other of the surfaces of the primary film layer 6.

After that, the transparent resin layer 3 was bonded to the surface of the pattern layer 5a of the primary film layer 6 by a dry lamination method via an adhesive for dry lamination (TAKELAC A540; manufactured by Mitsui Chemicals, Inc., applied amount 2 g/m²). After the embossed pattern 3a was formed on the surface of the transparent resin layer 3 of the laminated sheet, a two-part type urethane top coat (W184; manufactured by DIC Graphics Corp.) was applied at the applied amount 3 g/m² to thereby form the top coat layer 2. Thus, the decorative sheet 1 with a total thickness of 188 μm shown in the FIGURE was obtained.

In Preparation Example 1, the top coat layer 2 was prepared by adding 0.05, 0.2, 1.0, 2.5, 5.0 or 10.0 parts by mass of the radical scavenger vesicles 144, which is the hindered amine-based photostabilizer liposomes described above, to 100 parts by mass of the two-part type urethane top coat, which is the main component of the top coat layer 2. Thus, the decorative sheets 1 of Preparation Example 1 each having such top coat layers 2 were prepared.

Preparation Example 2

The decorative sheet of Preparation Example 2 was prepared in the same manner as Preparation Example 1 except that the radical scavenger vesicles 2020 were used instead of the radical scavenger vesicles 144, which were the hindered amine-based photostabilizer liposomes of Preparation Example 1.

Preparation Example 3

The decorative sheet of Preparation Example 3 was prepared in the same manner as Preparation Example 1 except that the radical scavenger vesicles 850 were used instead of the radical scavenger vesicles 144, which were the hindered amine-based photostabilizer liposomes of Preparation Example 1.

Preparation Example 4

The decorative sheet of Preparation Example 4 was prepared in the same manner as Preparation Example 1 except that 0.05, 0.2, 1.0, 2.5, 5.0 or 10.0 parts by mass of the radical scavenger vesicles 144 were each added, instead of TINUVIN 144, which was added to 100 parts by mass of highly crystalline homopolypropylene resin of Preparation Example 1, and 0.2 parts by mass of TINUVIN 144 was added, instead of the radical scavenger vesicles 144, to 100 parts by mass of the two-part type urethane top coat, which is the main component of the top coat layer 2.

Preparation Example 5

The decorative sheet of Preparation Example 5 was prepared in the same manner as Preparation Example 4 except that the radical scavenger vesicles 2020 were used instead of the radical scavenger vesicles 144, which were the hindered amine-based photostabilizer liposomes of Preparation Example 4.

Preparation Example 6

The decorative sheet of Preparation Example 6 was prepared in the same manner as Preparation Example 4 except that the radical scavenger vesicles 850 were used instead of the radical scavenger vesicles 144, which were the hindered amine-based photostabilizer liposomes of Preparation Example 4.

Preparation Example 7

The decorative sheet of Preparation Example 7 was prepared in the same manner as Preparation Example 1 except that 0.2 parts by mass of the radical scavenger vesicles 144 were added, instead of TINUVIN 144, which was added to 100 parts by mass of highly crystalline homopolypropylene resin of Preparation Example 1, and 0.2 parts by mass of the radical scavenger vesicles 144 were added to 100 parts by mass of the two-part type urethane top coat, which is the main component of the top coat layer 2.

Preparation Example 8

The decorative sheet of Preparation Example 8 was prepared in the same manner as Preparation Example 1 except that 5.0 parts by mass of the radical scavenger vesicles 144 were added, instead of TINUVIN 144, which was added to 100 parts by mass of highly crystalline homopolypropylene resin of Preparation Example 1, and 5.0 parts by mass of the radical scavenger vesicles 144 were added to 100 parts by mass of the two-part type urethane top coat, which is the main component of the top coat layer 2.

Preparation Example 9

The decorative sheet of Preparation Example 9 was prepared in the same manner as Preparation Example 1 except that 0.2 parts by mass of the radical scavenger vesicles 2020 were added, instead of TINUVIN 144, which was added to 100 parts by mass of highly crystalline homopolypropylene resin of Preparation Example 1, and 0.2 parts by mass of the radical scavenger vesicles 2020 were added to 100 parts by mass of the two-part type urethane top coat, which is the main component of the top coat layer 2.

Preparation Example 10

The decorative sheet of Preparation Example 10 was prepared in the same manner as Preparation Example 1 except that 5.0 parts by mass of the radical scavenger vesicles 2020 were added, instead of TINUVIN 144, which was added to 100 parts by mass of highly crystalline homopolypropylene resin of Preparation Example 1, and 5.0 parts by mass of the radical scavenger vesicles 2020 were added to 100 parts by mass of the two-part type urethane top coat, which is the main component of the top coat layer 2.

Preparation Example 11

The decorative sheet of Preparation Example 11 was prepared in the same manner as Preparation Example 1 except that 0.2 parts by mass of the radical scavenger vesicles 850 were added, instead of TINUVIN 144, which was added to 100 parts by mass of highly crystalline homopolypropylene resin of Preparation Example 1, and 0.2 parts by mass of the radical scavenger vesicles 850 were added to 100 parts by mass of the two-part type urethane top coat, which is the main component of the top coat layer 2.

Preparation Example 12

The decorative sheet of Preparation Example 12 was prepared in the same manner as Preparation Example 1 except that 5.0 parts by mass of the radical scavenger vesicles 850 were added, instead of TINUVIN 144, which was added to 100 parts by mass of highly crystalline homopolypropylene resin of Preparation Example 1, and 5.0 parts by mass of the radical scavenger vesicles 850 were added to 100 parts by mass of the two-part type urethane top coat, which is the main component of the top coat layer 2.

Preparation Example 13

The decorative sheet of Preparation Example 13 was prepared in the same manner as Preparation Example 7 except that 0.2 parts by mass of the radical scavenger vesicles 2020 were added, instead of the radical scavenger vesicles 144, to 100 parts by mass of highly crystalline homopolypropylene resin, which is the main component of the transparent resin layer 3 of Preparation Example 7.

Preparation Example 14

The decorative sheet of Preparation Example 14 was prepared in the same manner as Preparation Example 8 except that 5.0 parts by mass of the radical scavenger vesicles 2020 were added, instead of the radical scavenger vesicles 144, to 100 parts by mass of highly crystalline homopolypropylene resin, which is the main component of the transparent resin layer 3 of Preparation Example 8.

Preparation Example 15

The decorative sheet of Preparation Example 15 was prepared in the same manner as Preparation Example 7 except that 0.2 parts by mass of the radical scavenger vesicles 850 were added, instead of the radical scavenger vesicles 144, to 100 parts by mass of highly crystalline homopolypropylene resin, which is the main component of the transparent resin layer 3 of Preparation Example 7.

Preparation Example 16

The decorative sheet of Preparation Example 16 was prepared in the same manner as Preparation Example 8 except that 5.0 parts by mass of the radical scavenger vesicles 850 were added, instead of the radical scavenger vesicles 144, to 100 parts by mass of highly crystalline homopolypropylene resin, which is the main component of the transparent resin layer 3 of Preparation Example 8.

Preparation Example 17

The decorative sheet of Preparation Example 17 was prepared in the same manner as Preparation Example 9 except that 0.2 parts by mass of the radical scavenger vesicles 144 were added, instead of the radical scavenger vesicles 2020, which was added to 100 parts by mass of highly crystalline homopolypropylene resin, which is the main component of the transparent resin layer 3 of Preparation Example 9.

Preparation Example 18

The decorative sheet of Preparation Example 18 was prepared in the same manner as Preparation Example 10 except that 5.0 parts by mass of the radical scavenger vesicles 144 were added, instead of the radical scavenger vesicles 2020, which was added to 100 parts by mass of highly crystalline homopolypropylene resin, which is the main component of the transparent resin layer 3 of Preparation Example 10.

Preparation Example 19

The decorative sheet of Preparation Example 19 was prepared in the same manner as Preparation Example 9 except that 0.2 parts by mass of the radical scavenger vesicles 850 were added, instead of the radical scavenger vesicles 2020, which was added to 100 parts by mass of highly crystalline homopolypropylene resin, which is the main component of the transparent resin layer 3 of Preparation Example 9.

Preparation Example 20

The decorative sheet of Preparation Example 20 was prepared in the same manner as Preparation Example 10 except that 5.0 parts by mass of the radical scavenger vesicles 850 were added, instead of the radical scavenger vesicles 2020, which was added to 100 parts by mass of highly crystalline homopolypropylene resin, which is the main component of the transparent resin layer 3 of Preparation Example 10.

Preparation Example 21

The decorative sheet of Preparation Example 21 was prepared in the same manner as Preparation Example 11 except that 0.2 parts by mass of the radical scavenger vesicles 144 were added, instead of the radical scavenger vesicles 850, which was added to 100 parts by mass of highly crystalline homopolypropylene resin, which is the main component of the transparent resin layer 3 of Preparation Example 11.

Preparation Example 22

The decorative sheet of Preparation Example 22 was prepared in the same manner as Preparation Example 12 except that 5.0 parts by mass of the radical scavenger vesicles 144 were added, instead of the radical scavenger vesicles 850, which was added to 100 parts by mass of highly crystalline homopolypropylene resin, which is the main component of the transparent resin layer 3 of Preparation Example 12.

Preparation Example 23

The decorative sheet of Preparation Example 23 was prepared in the same manner as Preparation Example 11 except that 0.2 parts by mass of the radical scavenger vesicles 2020 were added, instead of the radical scavenger vesicles 850, which was added to 100 parts by mass of highly crystalline homopolypropylene resin, which is the main component of the transparent resin layer 3 of Preparation Example 11.

Preparation Example 24

The decorative sheet of Preparation Example 24 was prepared in the same manner as Preparation Example 12 except that 5.0 parts by mass of the radical scavenger vesicles 2020 were added, instead of the radical scavenger vesicles 850, which was added to 100 parts by mass of highly crystalline homopolypropylene resin, which is the main component of the transparent resin layer 3 of Preparation Example 12.

Comparative Example 1

The decorative sheet of Comparative Example 1 was prepared in the same manner as Preparation Example 1 except that photostabilizer and radical scavenger vesicles were not added to the highly crystalline homopolypropylene resin and the two-part type urethane top coat.

Comparative Example 2

The decorative sheet of Comparative Example 2 was prepared in the same manner as Preparation Example 1 except that 0.2 parts by mass of TINUVIN 144, CHIMASSORB 2020, and TINUVIN XT 850 were each used per 100 parts by mass of highly crystalline homopolypropylene resin, which is the main component of the transparent resin layer 3, and 0.2 parts by mass of TINUVIN 144 was added to the two-part type urethane top coat, which is the main component of the top coat layer 2.

Comparative Example 3

The decorative sheet of Comparative Example 3 was prepared in the same manner as Comparative Example 2 except that CHIMASSORB 2020 was used instead of TINUVIN 144, which was added to the two-part type urethane top coat of Comparative Example 2.

Comparative Example 4

The decorative sheet of Comparative Example 4 was prepared in the same manner as Comparative Example 2 except that TINUVIN XT 850 was used instead of TINUVIN 144, which was added to the two-part type urethane top coat of Comparative Example 2.

Comparative Example 5

The decorative sheet of Comparative Example 5 was prepared in the same manner as Preparation Example 1 except that TINUVIN 144, which was added to the two-part type urethane top coat of the Comparative Example 2 was modified to 5.0 parts by mass, and 5.0 parts by mass of TINUVIN 144, CHIMASSORB 2020, and TINUVIN XT 850 were each used per 100 parts by mass of highly crystalline homopolypropylene resin, which is the main component of the transparent resin layer 3.

Comparative Example 6

The decorative sheet of Comparative Example 6 was prepared in the same manner as Comparative Example 5 except that 5.0 parts by mass of CHIMASSORB 2020 was added, instead of TINUVIN 144, which was added to the two-part type urethane top coat of the Comparative Example 5, and 5.0 parts by mass of TINUVIN 144, CHIMASSORB 2020, and TINUVIN XT 850 were each used per 100 parts by mass of highly crystalline homopolypropylene resin, which is the main component of the transparent resin layer 3.

Comparative Example 7

The decorative sheet of Comparative Example 7 was prepared in the same manner as Comparative Example 5 except that 5.0 parts by mass of TINUVIN XT 850 was added, instead of TINUVIN 144, which was added to the two-part type urethane top coat of the Comparative Example 5, and 5.0 parts by mass of TINUVIN 144, CHIMASSORB 2020, and TINUVIN XT 850 were each used per 100 parts by mass of highly crystalline homopolypropylene resin, which is the main component of the transparent resin layer 3.

<Evaluation>

For each decorative sheet of Preparation Examples and Comparative Examples, the haze value was evaluated.

Further, a carbon arc weathering test according to JISB 7753 was performed by using a weatherability test machine (Sunshine Weather Meter: manufactured by Suga Test Instruments Co., Ltd.). The test time was 6000 hours. Thus, the change in glossiness before and after the weathering test was evaluated.

Further, the change in appearance of each decorative sheet before and after the weathering test was evaluated. The change in glossiness was rated as good when the value was within the range of 75% to 150% to the initial value, and rated as poor when the value was outside the range. The change in appearance was rated as follows.

The evaluation results obtained are shown in Tables 1, 2, and 3.

In the table, the evaluation results are rated as follows.

Good: No or small change observed

Poor: Severe whitening or partial cracking or damage observed

TABLE 1

| | Top coat layer | | Top coat and resin layer | Decorative sheet | |
|---|---|---|---|---|---|
| | Radical scavenger species | Added amount | Haze value | Change in glossiness | Change in appearance |
| Preparation Example 1 | Radical scavenger vesicle 144 | 0.05 | 7.0 | Poor | Poor |
| | | 0.2 | 7.1 | Good | Good |
| | | 1.0 | 7.2 | Good | Good |
| | | 2.5 | 7.2 | Good | Good |
| | | 5.0 | 7.5 | Good | Good |
| | | 10.0 | 12.0 | Good | Good |

| | Top coat layer | | Top coat and resin layer | Decorative sheet | |
|---|---|---|---|---|---|
| Sample | Radical scavenger species | Added amount | Haze value | Change in glossiness | Change in appearance |
| Preparation Example 2 | Radical scavenger vesicle 2020 | 0.05 | 7.2 | Poor | Poor |
| | | 0.2 | 7.5 | Good | Good |
| | | 1.0 | 7.6 | Good | Good |
| | | 2.5 | 7.7 | Good | Good |
| | | 5.0 | 8.0 | Good | Good |
| | | 10.0 | 15.0 | Good | Good |

TABLE 1-continued

| | Top coat layer | | Top coat and resin layer | Decorative sheet | |
|---|---|---|---|---|---|
| | Radical scavenger species | Added amount | Haze value | Change in glossiness | Change in appearance |
| Preparation Example 3 | Radical scavenger vesicle 850 | 0.05 | 6.9 | Poor | Poor |
| | | 0.2 | 7.0 | Good | Good |
| | | 1.0 | 7.2 | Good | Good |
| | | 2.5 | 7.2 | Good | Good |
| | | 5.0 | 7.5 | Good | Good |
| | | 10.0 | 23.5 | Good | Good |

| | Transparent resin layer | | Top coat and resin layer | Decorative sheet | |
|---|---|---|---|---|---|
| Sample | Radical scavenger species | Added amount | Haze value | Change in glossiness | Change in appearance |
| Preparation Example 4 | Radical scavenger vesicle 144 | 0.05 | 7.5 | Poor | Poor |
| | | 0.2 | 7.8 | Good | Good |
| | | 1.0 | 7.9 | Good | Good |
| | | 2.5 | 8.3 | Good | Good |
| | | 5.0 | 8.5 | Good | Good |
| | | 10.0 | 25.6 | Good | Good |

| | Transparent resin layer | | Top coat and resin layer | Decorative sheet | |
|---|---|---|---|---|---|
| | Radical scavenger species | Added amount | Haze value | Change in glossiness | Change in appearance |
| Preparation Example 5 | Radical scavenger vesicle 2020 | 0.05 | 7.0 | Poor | Poor |
| | | 0.2 | 7.2 | Good | Good |
| | | 1.0 | 7.3 | Good | Good |
| | | 2.5 | 7.2 | Good | Good |
| | | 5.0 | 7.7 | Good | Good |
| | | 10.0 | 25.0 | Good | Good |

| | Transparent resin layer | | Top coat and resin layer | Decorative sheet | |
|---|---|---|---|---|---|
| Sample | Radical scavenger species | Added amount | Haze value | Change in glossiness | Change in appearance |
| Preparation Example 6 | Radical scavenger vesicle 850 | 0.05 | 7.6 | Poor | Poor |
| | | 0.2 | 7.9 | Good | Good |
| | | 1.0 | 8.0 | Good | Good |
| | | 2.5 | 8.2 | Good | Good |
| | | 5.0 | 8.6 | Good | Good |
| | | 10.0 | 27.0 | Good | Good |

TABLE 2

| | Top coat layer | | Transparent resin layer | | Top coat and resin layer | Decorative sheet | |
|---|---|---|---|---|---|---|---|
| Sample | Radical scavenger species | Added amount | Radical scavenger species | Added amount | Haze value | Change in glossiness | Change in appearance |
| Preparation Example 7 | Radical scavenger vesicle 144 | 0.2 | Radical scavenger vesicle 144 | 0.2 | 7.5 | Good | Good |
| Preparation Example 8 | | 5.0 | | 5.0 | 8.2 | Good | Good |
| Preparation Example 9 | Radical scavenger | 0.2 | Radical scavenger | 0.2 | 7.3 | Good | Good |

TABLE 2-continued

| Sample | Top coat layer Radical scavenger species | Added amount | Transparent resin layer Radical scavenger species | Added amount | Top coat and resin layer Haze value | Decorative sheet Change in glossiness | Change in appearance |
|---|---|---|---|---|---|---|---|
| Preparation Example 10 | vesicle 2020 | 5.0 | vesicle 2020 | 5.0 | 8.1 | Good | Good |
| Preparation Example 11 | Radical scavenger | 0.2 | Radical scavenger | 0.2 | 7.3 | Good | Good |
| Preparation Example 12 | vesicle 850 | 5.0 | vesicle 850 | 5.0 | 7.5 | Good | Good |
| Preparation Example 13 | Radical scavenger | 0.2 | Radical scavenger | 0.2 | 7.3 | Good | Good |
| Preparation Example 14 | vesicle 144 | 5.0 | vesicle 2020 | 5.0 | 7.8 | Good | Good |
| Preparation Example 15 | Radical scavenger | 0.2 | Radical scavenger | 0.2 | 7.2 | Good | Good |
| Preparation Example 16 | vesicle 144 | 5.0 | vesicle 850 | 5.0 | 8.6 | Good | Good |
| Preparation Example 17 | Radical scavenger | 0.2 | Radical scavenger | 0.2 | 7.4 | Good | Good |
| Preparation Example 18 | vesicle 2020 | 5.0 | vesicle 144 | 5.0 | 8.2 | Good | Good |
| Preparation Example 19 | Radical scavenger | 0.2 | Radical scavenger | 0.2 | 7.4 | Good | Good |
| Preparation Example 20 | vesicle 2020 | 5.0 | vesicle 850 | 5.0 | 8.3 | Good | Good |
| Preparation Example 21 | Radical scavenger | 0.2 | Radical scavenger | 0.2 | 7.2 | Good | Good |
| Preparation Example 22 | vesicle 850 | 5.0 | vesicle 144 | 5.0 | 8.5 | Good | Good |
| Preparation Example 23 | Radical scavenger | 0.2 | Radical scavenger | 0.2 | 7.5 | Good | Good |
| Preparation Example 24 | vesicle 850 | 5.0 | vesicle 2020 | 5.0 | 8.6 | Good | Good |

TABLE 3

| Sample | Top coat layer Radical scavenger species | Added amount | Transparent resin layer Radical scavenger species | Added amount | Top coat and resin layer Haze value | Decorative sheet Change in glossiness | Change in appearance |
|---|---|---|---|---|---|---|---|
| Comparative Example 1 | None | | None | | 5.2 | Poor | Poor |
| Comparative Example 2 | TINUVIN 144 | 0.2 | TINUVIN 144 | 0.2 | 5.6 | Poor | Poor |
| | | 0.2 | CHIMASSORB 2020 | 0.2 | 5.6 | Poor | Poor |
| | | 0.2 | TINUVIN 850 | 0.2 | 5.9 | Poor | Poor |
| Comparative Example 3 | CHIMASSORB 2020 | 0.2 | TINUVIN 144 | 0.2 | 5.6 | Poor | Poor |
| | | 0.2 | CHIMASSORB 2020 | 0.2 | 6.0 | Poor | Poor |
| | | 0.2 | TINUVIN 850 | 0.2 | 5.9 | Poor | Poor |
| Comparative Example 4 | TINUVIN 850 | 0.2 | TINUVIN 144 | 0.2 | 5.8 | Poor | Poor |
| | | 0.2 | CHIMASSORB 2020 | 0.2 | 5.8 | Poor | Poor |
| | | 0.2 | TINUVIN 850 | 0.2 | 6.3 | Poor | Poor |
| Comparative Example 5 | TINUVIN 144 | 5.0 | TINUVIN 144 | 5.0 | 13.2 | Good | Good |
| | | 5.0 | CHIMASSORB 2020 | 5.0 | 14.6 | Good | Good |
| | | 5.0 | TINUVIN 850 | 5.0 | 15.0 | Good | Good |
| Comparative Example 6 | CHIMASSORB 2020 | 5.0 | TINUVIN 144 | 5.0 | 13.5 | Good | Good |
| | | 5.0 | CHIMASSORB 2020 | 5.0 | 17.0 | Good | Good |
| | | 5.0 | TINUVIN 850 | 5.0 | 16.8 | Good | Good |
| Comparative Example 7 | TINUVIN 850 | 5.0 | TINUVIN 144 | 5.0 | 15.2 | Good | Good |
| | | 5.0 | CHIMASSORB 2020 | 5.0 | 18.5 | Good | Good |
| | | 5.0 | TINUVIN 850 | 5.0 | 20.5 | Good | Good |

As shown in Tables 1 and 2, for the decorative sheets of Preparation Examples, in which the radical scavenger vesicles in the range of 0.2 parts by mass or more and 5.0 parts by mass or less were added to the content of the resin, good haze values were found, the change in glossiness after the weathering test was reduced, and change in appearance was less likely to occur. On the other hand, when the radical scavenger vesicles were less than 0.2 parts by mass, the change in glossiness after the weathering test and a change in appearance occurred. When the radical scavenger vesicles were more than 5.0 parts by mass, it was found that the haze value was large.

When the radical scavenger vesicles were less than 0.2 parts by mass, it was found by the weathering test that the resin was deteriorated and the surface of the coating layer was damaged and thus the glossiness was reduced. Further, the resin layers were peeled (appearance was changed) due to reduced adhesiveness between the resin layers. When the radical scavenger vesicles were more than 5.0 parts by mass, it was found that bleeding-out occurred on the layer to which the radical scavenger vesicles were excessively added, which caused an increase in the haze value.

Further, as shown in Table 3, when 0.2 parts by mass of the photostabilizer was added to each layer (see Comparative Examples 2 to 4) since the dispersibility was decreased due to the radical scavenger being used without forming vesicles. In these cases, the change in glossiness or the change in appearance occurred. The reason for this is that the dispersibility was poor compared with the radical scavenger in the form of vesicles, and thus the function of preventing deterioration of resin was reduced. On the other hand, when 5.0 parts by mass of the photostabilizer was added to each layer (see Comparative Examples 5 to 7), bleeding-out of the photostabilizer was observed on the surface since the dispersibility was decreased compared with the case where the radical scavenger was used in the form of vesicles.

MODIFICATION EXAMPLES

Next, a specific example in which a paper substrate is used as the substrate layer 6 (modified example) will now be described.

That is, impregnated paper having a basis weight of 50 g/m² (GFR-506, manufactured by Kohjin Co., Ltd.) was used as the substrate layer 6. Then, the solid ink layer 5b as a base and the pattern layer 5a were formed in this order on one side of the substrate layer 6 by using oil-based nitrocellulose resin gravure printing ink (PCNT (PCRNT) for each color; manufactured by Toyo Ink Co., Ltd.). For the pattern layer 5a, a wood grain pattern was used.

Subsequently, ink for a first gloss control layer was applied to the substrate layer 6, on which the pattern layer 5a was formed, to entirely cover one surface of the substrate layer 6 to thereby form a first gloss control layer constituting the top coat layer. The ink was composed of 8 parts by mass of silica-based matting agent (Mizukasil 310P; manufactured by Fuji Silysia Chemical Ltd.), 10 parts by mass of polyisocyanate (UR190B curing agent; manufactured by Toyo Ink Co., Ltd.), and 1 parts by mass of the radical scavenger vesicles 850 per 100 parts by mass of acrylic polyol (6KW-700; manufactured by Taisei Fine Chemical Co., Ltd.). The coating amount of the ink was 2.5 g/m². The thickness obtained by cross-sectional observation was 2.1 μm. The average particle diameter of the silica-based matting agent was 2.7 μm.

Next, ink for a second gloss control layer was applied on the first gloss control layer 5 at a portion immediately above the pattern layer 5a to thereby form a second gloss control layer constituting the top coat layer. The ink was composed of 3 parts by mass of silica-based matting agent (Mizukasil 310P; manufactured by Fuji Silysia Chemical Ltd.), and 10 parts by mass of polyisocyanate (UR190B curing agent; manufactured by Toyo Ink Co., Ltd.) per 100 parts by mass of acrylic polyol (6KW-700; manufactured by Taisei Fine Chemical Co., Ltd.). The average particle diameter of the silica-based matting agent was 2.7 μm.

For the decorative sheets having the impregnated paper processed by the above process as a substrate, evaluation was performed by the weathering test performed in the same manner as above. As the results of evaluation, it was found that the change in glossiness and the change in appearance relative to the initial value were good.

As seen from the aforementioned results, the decorative sheets 1 of Preparation Examples according to the present invention have high weatherability and designability.

Further, the decorative sheet 1 of the present invention is not limited to the aforementioned embodiments and examples, and various modifications may be made within a range not departing from the spirit of the present invention.

REFERENCE SIGNS LIST

1: decorative sheet; 2: top coat layer; 3: transparent resin layer; 3a: embossed pattern; 4: adhesive layer; 5: ink layer; 5a: pattern layer; 5b: solid ink layer; 6: primary film layer (substrate layer); 7: adhesive resin layer.

What is claimed is:

1. A decorative sheet, comprising:
a substrate layer, and
one or more layers of at least one of a transparent resin layer and a top coat layer provided on one surface of the substrate layer, the one or more layers being provided as a front surface layer,
wherein at least one layer which forms the front surface layer contains radical scavenger liposomes, wherein the radical scavenger liposome comprises a hindered amine-based photostabilizer as the radical scavenger encapsulated within a monolayer outer membrane made of phospholipid, wherein an amount of the radical scavenger liposomes is from 0.2 parts to 5.0 parts by mass per 100 parts per mass of a resin of the top coat layer and/or a resin of the transparent resin layer.

2. The decorative sheet of claim 1, wherein the resin of the transparent resin layer is an olefin-based resin and the transparent resin layer contains the radical scavenger liposomes in the amount of from 0.2 parts to 5.0 parts by mass per 100 parts mass of the resin of the transparent resin layer.

3. The decorative sheet of claim 1, wherein the resin of the top coat layer is an urethane-based resin and the top coat layer contains the radical scavenger liposomes in the amount of from 0.2 parts to 5.0 parts by mass per 100 parts mass of the resin of the top coat layer.

4. The decorative sheet of claim 1, wherein the hindered amine-based photostabilizer is encapsulated within the monolayer outer membrane made of phospholipid via a supercritical reverse phase evaporation process.

5. The decorative sheet of claim 1, wherein
the transparent resin layer and the top coat layer formed on the transparent resin layer are provided as the front surface layer,
an embossed pattern is formed on a surface of the transparent resin layer facing the top coat layer, and
the top coat layer is at least embedded in a recess of the embossed pattern.

6. The decorative sheet of claim 1, wherein
the transparent resin layer and the top coat layer are provided as the front surface layer, and
the transparent resin layer and the top coat layer each contain an ultraviolet absorbent.

7. The decorative sheet of claim 1, wherein
at least the transparent resin layer is provided as the front surface layer, and
an ink layer containing a photostabilizer is provided as an underside layer of the transparent resin layer.

8. A decorative sheet, comprising:
a substrate layer, and
one or more layers of at least one of a transparent resin layer and a top coat layer provided on one surface of the substrate layer, the one or more layers being provided as a front surface layer,
wherein at least one layer which forms the front surface layer is formed by adding radical scavenger liposomes, wherein the radical scavenger liposome comprises a hindered amine-based photostabilizer as the radical scavenger encapsulated within a monolayer outer membrane made of phospholipid, to a resin constituting the at least one layer which forms the front surface layer, wherein an amount of the radical scavenger liposomes is from 0.2 parts to 5.0 parts by mass per 100 parts per mass of a resin of the top coat layer and/or a resin of the transparent resin layer.

9. The decorative sheet of claim 8, wherein the resin of the transparent resin layer is an olefin-based resin and the radical scavenger liposomes are added to the transparent resin layer in the amount of from 0.2 parts to 5.0 parts by mass per 100 parts mass of the resin of the transparent resin layer.

10. The decorative sheet of claim 8, wherein the resin of the top coat layer is an urethane-based resin and the radical scavenger liposomes are added to the top coat layer in the amount of from 0.2 parts to 5.0 parts by mass per 100 parts mass of the resin of the top coat layer.

11. The decorative sheet of claim 8, wherein the hindered amine-based photostabilizer is encapsulated within the monolayer outer membrane made of phospholipid via a supercritical reverse phase evaporation process.

12. A method for producing a decorative sheet including a substrate layer, one or more layers of at least one of a transparent resin layer and a top coat layer provided on one surface of the substrate layer, the one or more layers being provided as a front surface layer, comprising
forming at least one layer of the front surface layer by adding radical scavenger liposomes, wherein the radical scavenger liposome comprises a hindered amine-based photostabilizer as the radical scavenger encapsulated within a monolayer outer membrane made of phospholipid, to a resin constituting the at least one layer which forms the front surface layer, wherein an amount of the radical scavenger liposomes is from 0.2 parts to 5.0 parts by mass per 100 parts per mass of a resin of the top coat layer and/or a resin of the transparent resin layer.

13. The method of claim 12, wherein the resin of the transparent resin layer is an olefin-based resin and the radical scavenger liposomes are added to the transparent resin layer in the amount of from 0.2 parts to 5.0 parts by mass per 100 parts mass of the resin of the transparent resin layer.

14. The method of claim 12, wherein the resin of the top coat layer is an urethane-based resin and the radical scavenger liposomes are added to the top coat layer in the amount of from 0.2 parts to 5.0 parts by mass per 100 parts mass of the resin of the top coat layer.

15. The method of claim 12, wherein the hindered amine-based photostabilizer is encapsulated within the monolayer outer membrane made of phospholipid via a supercritical reverse phase evaporation process.

16. The method for producing a decorative sheet of claim 12, wherein
the transparent resin layer and the top coat layer formed on the transparent resin layer are provided as the front surface layer,
an embossed pattern is formed on a surface of the transparent resin layer facing the top coat layer, and
the top coat layer is at least embedded in a recess of the embossed pattern.

17. The method for producing a decorative sheet of claim 12, wherein
the transparent resin layer and the top coat layer are provided as the front surface layer, and
an ultraviolet absorbent is added to each of a resin constituting the transparent resin layer and a resin constituting the top coat layer.

18. The method for producing a decorative sheet of claim 12, wherein
at least the transparent resin layer is provided as the front surface layer, and
an ink layer containing a photostabilizer is provided as an underside layer of the transparent resin layer.

* * * * *